United States Patent
Drugge et al.

(10) Patent No.: US 8,238,472 B2
(45) Date of Patent: Aug. 7, 2012

(54) CARRIER SEPARATION FREQUENCY ERROR ADJUSTMENT FOR UL MULTIPLE CARRIER OPERATION

(75) Inventors: Oskar Drugge, Lund (SE); Anders Wallén, Ystad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 600 days.

(21) Appl. No.: 12/419,675

(22) Filed: Apr. 7, 2009

(65) Prior Publication Data

US 2010/0128829 A1 May 27, 2010

Related U.S. Application Data

(60) Provisional application No. 61/116,950, filed on Nov. 21, 2008.

(51) Int. Cl.
*H04K 1/02* (2006.01)
*H04L 25/03* (2006.01)
*H04L 25/49* (2006.01)

(52) U.S. Cl. ........ 375/296; 375/275; 375/295; 375/354; 333/110; 342/111

(58) Field of Classification Search ............ 375/275, 375/295, 354, 296, 261; 333/110; 342/111
See application file for complete search history.

(56) References Cited

U.S. PATENT DOCUMENTS

| 5,121,412 | A | * | 6/1992 | Borth | 375/308 |
| 5,805,567 | A | * | 9/1998 | Ramesh | 370/204 |
| 5,999,575 | A | * | 12/1999 | Tanaka et al. | 375/329 |
| 6,289,061 | B1 | * | 9/2001 | Kandala et al. | 375/344 |
| 2002/0191709 | A1 | * | 12/2002 | Hunton | 375/295 |
| 2003/0008626 | A1 | * | 1/2003 | Miyano et al. | 455/114 |
| 2003/0206600 | A1 | * | 11/2003 | Vankka | 375/261 |
| 2005/0110568 | A1 | * | 5/2005 | Robinson et al. | 330/151 |
| 2006/0171488 | A1 | | 8/2006 | Rosenlof et al. | |
| 2007/0274471 | A1 | * | 11/2007 | Shako et al. | 379/88.01 |
| 2008/0291974 | A1 | * | 11/2008 | Collados et al. | 375/130 |
| 2009/0279476 | A1 | * | 11/2009 | Li et al. | 370/328 |

* cited by examiner

*Primary Examiner* — Shuwang Liu
*Assistant Examiner* — Sung Ahn
(74) *Attorney, Agent, or Firm* — Coats & Bennett, P.L.L.C.

(57) ABSTRACT

One or more carrier signals in a multiple-carrier UE transmitter are frequency-adjusted to account for an estimated error in the separation frequency between the transmitted carrier signals. The adjustment is applied when generating the UL signals for the respective carrier frequencies in digital baseband of the UE. In one embodiment, one or more of the modulators that apply the carrier separation frequency additionally apply a frequency correction. In another embodiment, first mixers apply the carrier separation frequency to each different carrier signal. One or more carrier signal paths include a second mixer applying a frequency correction to the carrier signal. The RF modulation frequency may also be adjusted to partially compensate for the estimated carrier separation frequency error.

16 Claims, 3 Drawing Sheets

CARRIER SEPARATION FREQUENCY ERROR ADJUSTMENT FOR UL MULTIPLE CARRIER OPERATION

This application claims priority to U.S. Provisional Patent Application Ser. No. 61/116,950, filed Nov. 21, 2008, and incorporated herein by reference in its entirety.

TECHNICAL FIELD

The present invention relates generally to wireless communications, and in particular to carrier separation frequency error adjustment in the transmitter of a multiple-cell User Equipment.

BACKGROUND

Wireless communication network technology continues to expand at a rapid pace, enabling increasingly sophisticated services via dramatic improvements in bandwidth, signal quality, geographic coverage, and the like. For example, multiple-cell High-Speed Downlink Packet Access (HSDPA) operation is being standardized by the $3^{rd}$ Generation Partnership Program (3GPP). In particular, 3GPP Work Item Description RP-080490, "Dual-Cell HSDPA operation on adjacent carriers" specifies dual-cell operation using two adjacent carriers in the downlink (DL). In dual-cell HSDPA, separate data streams are modulated onto separate carriers, and transmitted together to User Equipment (UE) in the cell (dual-cell is thus synonymous with dual-carrier). The dual-cell HSDPA operation can improve the bit rate in terms of peak rate and average bit rate from the end-user's perspective. Dual-cell HSDPA has been included in 3GPP Release 8 specification, and some related extensions have been proposed for inclusion in Release 9. One such extension, aims at introducing dual-carrier operation also in the uplink (UL) direction, as described in the 3GPP Work Item Description RP-090014, "Dual-Cell HSUPA".

HSDPA in legacy wireless networks is based on single cell, or carrier, operation. The DL frequency error between a transmitter and receiver—caused by frequency error in the base station and Doppler shift in the channel due to UE mobility—is compensated in the UE for single carrier operation. The required base station frequency accuracy for single-carrier in 3GPP is 0.05 ppm for macro base stations, and 0.1 ppm for shorter range base stations. Since the transmitter circuits for different carrier frequencies typically are located on different boards, and no requirement exists on relative frequency error between different carriers, there will most likely be a non-zero relative frequency error between the carriers. UEs may need to compensate for this error in order to achieve good receiver performance on both carriers. U.S. patent application Ser. No. 12/248,756, titled "Relative Frequency Error Compensation for Multi-Carrier Receivers," filed Oct. 9, 2008, assigned to the assignee of the present application, and incorporated herein by reference in its entirety, addresses this problem in the DL. If multiple carriers are deployed also in the UL, a similar compensation may be needed on the transmitter side in the UE, and/or in the base station, or Node B, receiver.

For legacy, single carrier UEs, the transmitted (UL) carrier frequency is required to follow the received (DL) carrier frequency, with a fixed frequency separation determined by the duplex distance in the operating band. This is accomplished by using the same frequency reference for both receiver and transmitter, and having an automatic frequency control (AFC) algorithm adjusting this common frequency reference to achieve zero frequency error in the received signal. However, if the UE has some non-zero frequency error itself, and/or it is causing some Doppler shift due to movement towards or away from the base station, the Node B receiver may need to compensate for this individually for each UE.

In the case of multiple UL carriers transmitted from the same UE, it is reasonable to assume that the UE should attempt to have its transmitted carrier frequencies follow the corresponding downlink frequencies in a similar manner—per carrier.

There are two basic multi-carrier transmitter architectures to achieve per-carrier frequency following. In the first architecture, separate baseband (BB) and radio frequency (RF) circuits are used for each carrier. In this architecture, the UE operates as parallel legacy UEs, wherein each different carrier signal circuit performs frequency error compensation individually. The deficiency of this solution is the duplication of hardware, which increases cost, complexity, die area and power consumption.

The other architecture is to utilize joint RF and BB processing for all carriers in the same circuit. In this case, signals corresponding to the different carrier frequencies are generated with a fixed, nominal frequency separation. However, state of the art transmitter designs utilizing this architecture do not account for any frequency error between the carriers. Such a solution would increase the perceived frequency error in the Node B receiver, thus potentially degrading demodulation performance.

SUMMARY

According to one or more embodiments disclosed and claimed herein, one or more carrier signals in a multiple-carrier UE transmitter are frequency-adjusted to account for an estimated error in the separation frequency between the transmitted carrier signals. The adjustment is applied when generating the UL signals for the respective carrier frequencies in digital baseband of the UE. In one embodiment, one or more of the modulators that apply the carrier separation frequency additionally apply a frequency correction. In another embodiment, first mixers apply the carrier separation frequency to each different carrier signal. One or more carrier signal paths include a second mixer applying a frequency correction to the carrier signal. The RF modulation frequency may also be adjusted to partially compensate for the estimated carrier separation frequency error. Estimates of the relative frequency error between the carrier frequencies may be obtained, e.g., by methods described in the above-referenced U.S. patent application Ser. No. 12/248,756, and are beyond the scope of this disclosure.

In one embodiment, the present invention relates to a method of transmitting multi-carrier communications signals from UEs in a wireless communication network. A first series of signal samples is modulated at a first carrier separation frequency to generate a first carrier signal. A second series of signal samples is modulated at a second carrier separation frequency to generate a second carrier signal, separated in frequency from the first carrier signal by a predetermined amount. An error in the separation between the first and second carrier frequencies at a receiver is estimated. At least one of the first and second carrier signals is frequency-adjusted to compensate for the carrier separation frequency error. The adjusted first and second carrier frequency signals are combined to generate a wideband signal, and the wideband signal is processed and transmitted.

In another embodiment, the present invention relates to a transmitter in a UE that is operative in a wireless communication network. The transmitter includes a first modulator operative to modulate a first series of signal samples by mixing the samples with a first carrier separation frequency, to generate a first carrier signal. The transmitter also includes a second modulator operative to modulate a second series of signal samples by mixing the samples with a second carrier separation frequency to generate a second carrier signal, separated in frequency from the first carrier signal by a predetermined amount. The transmitter further includes an adder operative to combine the first and second carrier signals to generate a wideband signal, and transmitter circuits operative to process and transmit the wideband signal. At least one of the first and second modulator is further operative to frequency-adjust at least one of the first and second carrier signals to compensate for an estimated carrier separation frequency error.

DETAILED DESCRIPTION

Figure 1:
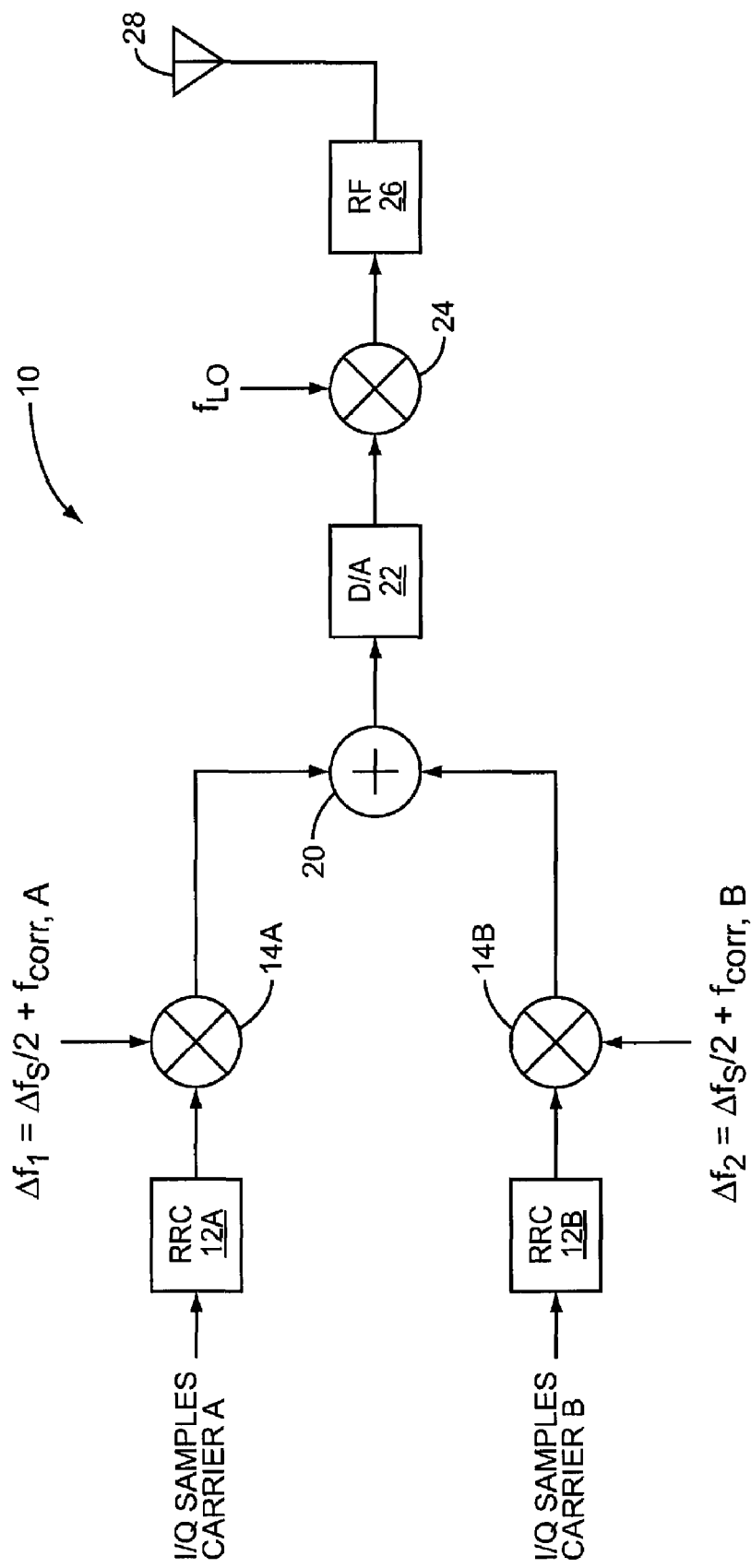
FIG. 1 is functional block diagram of a multiple-carrier transmitter wherein a carrier separation frequency error adjustment is applied to one or more signals when they are modulated to the different carriers.

FIG. 1 depicts one embodiment of a multiple-carrier transmitter 10 for a wireless communication network UE. The transmitter 10 receives a series of baseband I/Q signal samples for each carrier. The transmitter 10 comprises a pulse-shaping filter 12 and carrier separation frequency modulator 14 for each carrier, an adder 20, digital-to-analog converter 22, RF circuits 26 including an RF modulator and a power amplifier. Multiple-carrier UL communication signals are transmitted to the wireless communication network on one or more antennas 28. Although two carriers are depicted for simplicity, those of skill in the art will readily recognize that the teachings of the present disclosure may easily be extended to any number of UL carriers.

In the embodiment depicted, the pulse-shaping filter 12 for each carrier signal comprises a root raised cosine (RRC) filter 12, although other appropriate filters may be used, as required or desired for a particular implementation. The modulators 14A, 14B shift the signals from baseband to separated carrier frequencies, such as by multiplying the I/Q samples with a complex number having unit amplitude and a linearly varying phase proportional to the desired frequency shift. For the case of two adjacent WCDMA carriers—and ignoring, at this point, any relative frequency error—the two carrier signals would be shifted as $$\Delta f_A = +\frac{\Delta f_S}{2}$$

and $$\Delta f_B = -\frac{\Delta f_S}{2}$$

where $\Delta f_S$ is the nominal carrier separation frequency, typically 5 MHz.

The frequency-shifted signals are then added, forming a wideband signal that is then passed through a digital-to-analog converter 22 to convert it to analog form. The analog wideband signal is then modulated to RF frequency by mixing it a 24 with a local oscillator (LO) frequency, which may for example be the average of the two UL carrier frequencies. In general, $f_{LO}$ is any linear combination of the two UL carrier frequencies, with the sum of the coefficients equal to one, provided that the frequency shifts $\Delta f_A$ and $\Delta f_B$ of the two carriers are changed accordingly. The analog RF signal is then further processed by RF circuits 26, which may include analog filtering and power amplification. The amplified RF signal is transmitted on one or more antennas 28 to one or more wireless communication network receivers.

As discussed above, in practice there will likely be an error $\Delta f_{err}$ in the nominal separation frequency $\Delta f_S$ between the two (or more) carrier signals. This error may be estimated, and compensated by adjusting one, some, or all of $\Delta f_A$, $\Delta f_B$, and $f_{LO}$. The primary purpose of $\Delta f_A$ and $\Delta f_B$ is to ensure that the intended frequency separation between the two carriers is maintained, and the primary purpose of $f_{LO}$ is to ensure that the absolute frequencies of the two carriers are achieved. In one embodiment, that is likely to be used in practice, $f_{LO}$ (the RF local oscillator frequency) is set to follow the frequency of a corresponding analog mixer at the UE receiver side, with a fixed shift corresponding to the carrier separation frequency (i.e., the duplex distance). As depicted in FIG. 1, digital domain frequency shift of each carrier can be set to $$\Delta f_A = +\frac{\Delta f_S}{2} + f_{corr,A}$$

and $$\Delta f_B = -\frac{\Delta f_S}{2} + f_{corr,B},$$

where $f_{corr,i}$ are frequency corrections based on estimates of the frequency error for each carrier. The intended frequency separation between the carriers is maintained provided that $f_{corr,A} - f_{corr,B} = \Delta f_{err}$.

The estimates of the frequency error for each carrier comprise calculated estimates of the carrier separation frequency error. Alternatively, they may be derived from an actual frequency difference between carrier frequencies of a received, DL multiple-carrier signal. In general, the carrier separation frequency estimates can be obtained using any of the methods described in the above-referenced U.S. patent application Ser. No. 12/248,756.

Note that, although a correction is depicted as being applied to each carrier signal, in practice, only one signal may need to be corrected (i.e., relative to the other).

In another embodiment (not shown), $f_{LO}$ may be adjusted by a local oscillator that generates $f_{LO}$, by including some of the $f_{corr,i}$ terms, with $\Delta f_A$ and $\Delta f_B$ adjusted accordingly. For example, if no adjustment is made to the first carrier in digital domain, $f_{LO}$ must instead be adjusted to capture the error on this carrier. Such an implementation is well within the skill of those in the art, given the teachings of the present disclosure.

Figure 2:
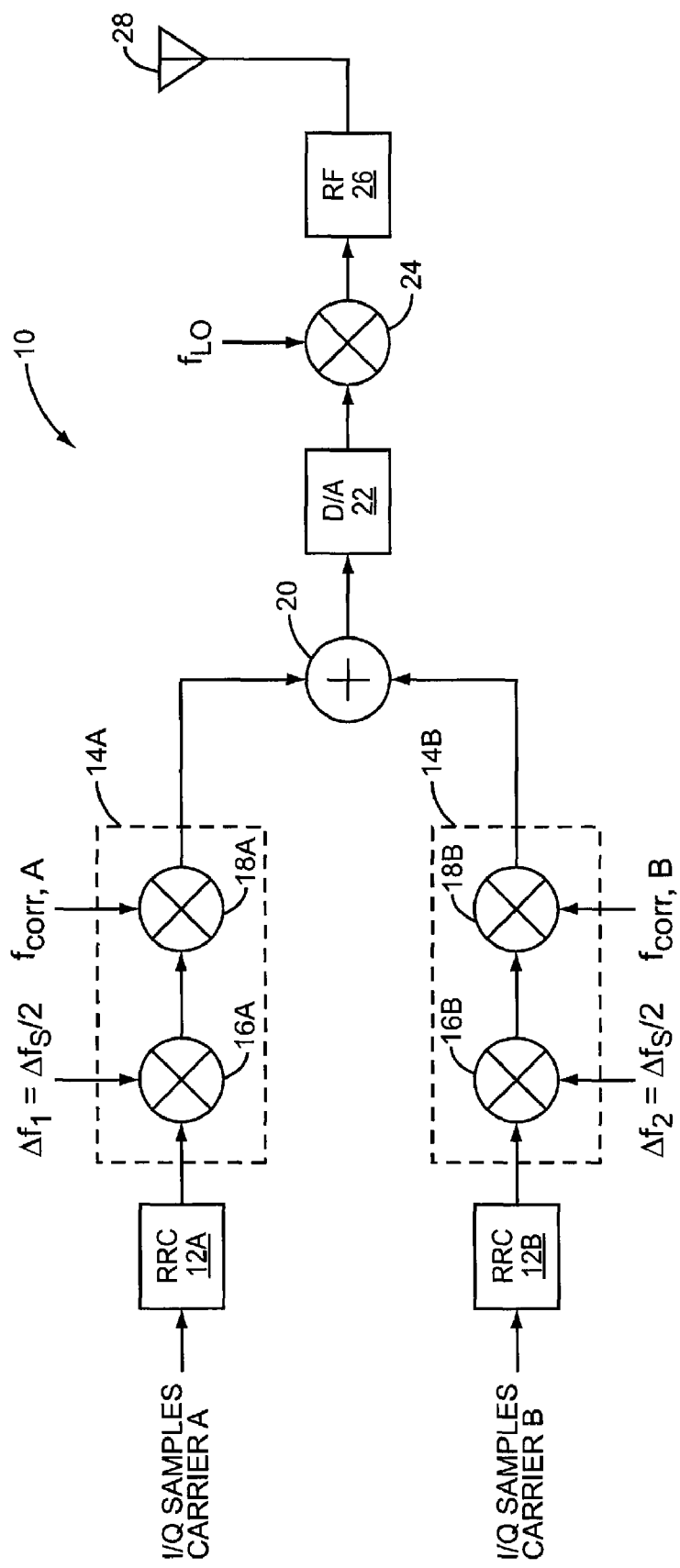
FIG. 2 is functional block diagram of a multiple-carrier transmitter wherein a carrier separation frequency error adjustment is applied to one or more signals separately from the different carrier modulation.

FIG. 2 depicts another embodiment, wherein for implementation reasons, such as required bit width, each carrier separation frequency modulator 14A, 14B is implemented with two mixers 16, 18. The first mixer 16A, 16B implements the carrier separation frequency shift, and the second mixer 18A, 18B applies a frequency adjustment to compensate for the carrier separation frequency error. As indicated by the dashed-line box, for each carrier signal, the two series mixers 16, 18 are functionally equivalent to the single mixer 14 depicted in FIG. 1. Here again, depending on the distribution of the error between $f_{LO}$ and $f_{corr,i}$, the frequency adjustment on one of the carriers may not be necessary.

Figure 3:
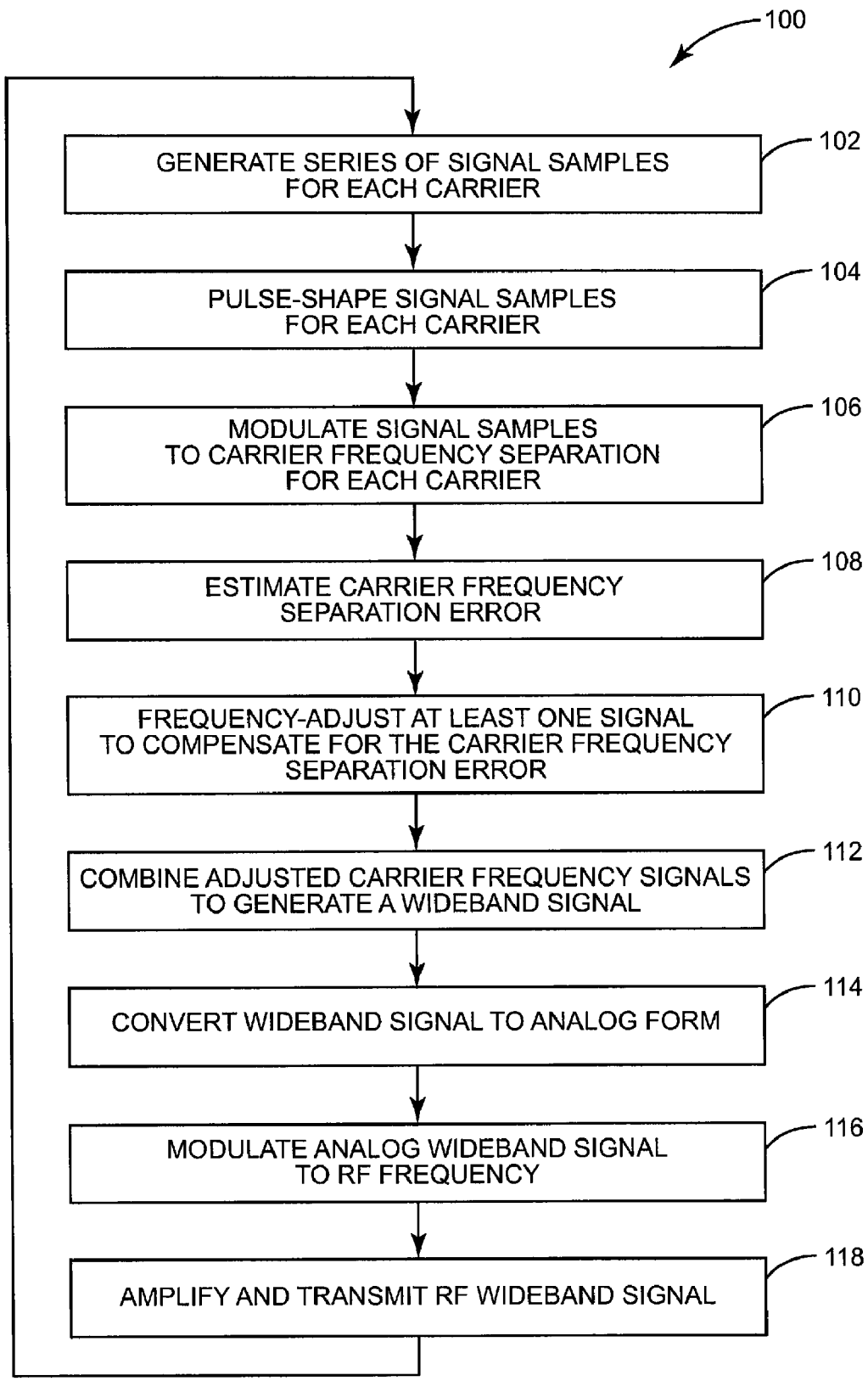
FIG. 3 is a flow diagram depicting a method of transmitting multi-carrier communications signals from UE in a wireless communication network.

FIG. 3 depicts a method 100 of transmitting a UL multiple-carrier signal from a UE in a wireless communication network. The UE generates a series of signal samples for each carrier (block 102). The signal samples for each carrier are independently pulse-shaped (block 104), and modulated to a predetermined, nominal carrier separation frequency (block 106). An error in the actual carrier separation frequency is estimated (block 108), and a frequency adjustment is applied to at least one carrier signal to compensate for the carrier separation frequency error (block 110). This may comprise adjusting the carrier separation modulation frequency $\Delta f_A$, $\Delta f_B$ of one or more carrier signals, and/or the RF modulation frequency $f_{LO}$. The carrier separation modulation frequencies $\Delta f_A$, $\Delta f_B$ may be frequency-adjusted by adjusting the modulation frequency applied to the carrier signal (FIG. 1), or the adjustment may be separately applied to the modulated signal (FIG. 2). The carrier separation modulated and frequency-adjusted carrier signals are then combined to generate a wideband signal (block 112). The wideband signal is converted to analog form (block 114), modulated to RF (block 116), and amplified and transmitted to one or more wireless communication network receivers (block 118).

According to embodiments described herein, a UE capable of transmitting multiple-carrier signals may adjust its transmit frequencies to compensate for a carrier separation frequency error between carriers. This may result in improved UL performance at the base station receiver and decreased UE transmitter die area and decreased UE complexity and power consumption.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of transmitting multi-carrier communications signals from User Equipment (UE) in a wireless communication network, comprising:
   modulating a first series of baseband I and Q signal samples at a first carrier separation frequency to generate a first carrier signal; and
   modulating a second series of baseband I and Q signal samples at a second carrier separation frequency to generate a second carrier signal, separated in frequency from the first carrier signal by a predetermined amount;
   estimating an error in the separation between the first and second carrier frequencies at a receiver;
   frequency-adjusting at least one of the first and second carrier signals to compensate for the carrier separation frequency error;
   combining the adjusted first and second carrier frequency signals to generate a wideband signal; and
   processing and transmitting the wideband signal.

2. The method of claim 1 wherein frequency-adjusting at least one of the first and second carrier signals to compensate for the carrier separation frequency error comprises adjusting the carrier modulation frequency of the frequency-adjusted signal to compensate for the carrier separation frequency error.

3. The method of claim 1 wherein frequency-adjusting at least one of the first and second carrier signals to compensate for the carrier separation frequency error comprises mixing the carrier signal with a correction frequency to compensate for the carrier separation frequency error.

4. The method of claim 1 wherein processing and transmitting the wideband signal comprises:
   converting the wideband signal to an analog form;
   modulating the analog wideband signal to radio frequency (RF) by mixing it with a local oscillator (LO) frequency;
   amplifying the RF wideband signal; and
   transmitting the amplified RF wideband signal.

5. The method of claim 4 wherein the LO frequency is a linear combination of the carrier frequencies with the sum of the coefficients equal to one.

6. The method of claim 5 wherein the LO frequency is the average of the carrier frequencies.

7. The method of claim 4 wherein the LO frequency comprises a frequency applied to a corresponding analog mixer in a receiver circuit at the UE, offset by a predetermined frequency separation and wherein the receiver mixer frequency is controlled by an automatic frequency control circuit to minimize frequency error between a transmitter and the receiver.

8. The method of claim 4 further comprising adjusting the LO frequency to compensate for the carrier separation frequency error, with concomitant adjustments to the first and second carrier frequencies.

9. The method of claim 1 wherein the frequency adjustment applied to at least one carrier signal is based on an estimate of a desired deviation from the predetermined carrier separation frequency.

10. The method of claim 1 wherein the frequency adjustment applied to at least one carrier signal is based on the deviation from a nominal frequency difference between components of a received signal, wherein each component was modulated onto separate carrier frequencies.

11. A transmitter in User Equipment (UE) operative in a wireless communication network, comprising:
    a first modulator operative to modulate a first series of baseband I and Q signal samples by mixing the samples with a first carrier separation frequency, to generate a first carrier signal;
    a second modulator operative to modulate a second series of baseband I and Q signal samples by mixing the samples with a second carrier separation frequency to generate a second carrier signal, separated in frequency from the first carrier signal by a predetermined amount, but wherein the predetermined separation between the first and second carrier frequencies include an error;
    an adder operative to combine the first and second carrier signals to generate a wideband signal; and
    transmitter circuits operative to process and transmit the wideband signal;
    wherein at least one of the first and second modulator is further operative to frequency-adjust at least one of the first and second carrier signals to compensate for the estimated carrier separation frequency error.

12. The transmitter of claim 11 wherein each modulator is operative to apply a carrier separation frequency component to its associated signal samples, and wherein at least one modulator is further operative to apply a frequency adjustment component to compensate for the estimated carrier separation frequency error.

13. The transmitter of claim 11 wherein each modulator comprises a first mixer operative to mix its associated signal samples with a carrier separation frequency, and wherein at least one modulator further comprises a second mixer operative to mix the associated signal samples with a correction frequency to compensate for an estimated carrier separation frequency error.

14. The transmitter of claim 11 wherein the transmitter circuits comprise:
   a digital to analog converter operative to convert the wideband signal to an analog form;
   a mixer operative to modulate the analog wideband signal to radio frequency (RF) by mixing it with a local oscillator (LO) frequency;
   an RF amplifier operative to amplify the RF wideband signal; and
   a transmitter operative to transmit the amplified RF wideband signal.

15. The transmitter of claim 14 wherein the transmitter further comprises a local oscillator operative to adjust the LO frequency to compensate for the carrier separation frequency error, with concomitant adjustments to the first and second carrier frequencies.

16. User Equipment (UE) operative in a wireless communication network, the UE comprising:
   a transmitter comprising:
      a first modulator operative to modulate a first series of baseband I and Q signal samples by mixing the samples with a first carrier separation frequency, to generate a first carrier signal;
      a second modulator operative to modulate a second series of baseband I and Q signal samples by mixing the samples with a second carrier separation frequency to generate a second carrier signal, separated in frequency from the first carrier signal by a predetermined amount, but wherein the predetermined separation between the first and second carrier frequencies include an error;
      an adder operative to combine the first and second carrier signals to generate a wideband signal; and
      transmitter circuits operative to process and transmit the wideband signal;
   wherein at least one of the first and second modulator is further operative to frequency-adjust at least one of the first and second carrier signals to compensate for the estimated carrier separation frequency error.

* * * * *

UNITED STATES PATENT AND TRADEMARK OFFICE
CERTIFICATE OF CORRECTION

Page 1 of 1

PATENT NO.         : 8,238,472 B2
APPLICATION NO.    : 12/419675
DATED              : August 7, 2012
INVENTOR(S)        : Drugge et al.

It is certified that error appears in the above-identified patent and that said Letters Patent is hereby corrected as shown below:

In Column 5, Line 58, in Claim 1, delete "signal; and" and insert -- signal; --, therefor.

Signed and Sealed this
Eighteenth Day of December, 2012

David J. Kappos
*Director of the United States Patent and Trademark Office*